United States Patent [19]

Tanaka

[11] Patent Number: 5,140,308
[45] Date of Patent: Aug. 18, 1992

[54] RADIO AUTOMATIC ALARM TRANSFER SYSTEM

[75] Inventor: Kenya Tanaka, Chofu, Japan

[73] Assignee: Fujitsu Limited, Kawasaki, Japan

[21] Appl. No.: 469,027

[22] Filed: Jan. 23, 1990

[30] Foreign Application Priority Data

Jan. 24, 1989 [JP] Japan .................... 1-14717

[51] Int. Cl.⁵ ............... G08B 1/08; H04B 1/00
[52] U.S. Cl. .................. 340/539; 340/425.5;
340/426; 340/531; 340/425; 379/42; 379/44;
455/54.1
[58] Field of Search ........... 340/539, 425.5, 426,
340/825.69, 425, 825.72, 825.44, 825.45, 311.1,
531; 379/37-44, 58, 56, 57, 59, 60, 65;
455/53-56, 67

[56] References Cited

U.S. PATENT DOCUMENTS

| | | | |
|---|---|---|---|
| 4,208,630 | 6/1980 | Martinez | 375/7 |
| 4,652,859 | 3/1987 | Van Wienen | 340/531 |
| 4,692,742 | 9/1987 | Raizen | 340/539 |
| 4,821,309 | 4/1989 | Namekawa | 379/58 |
| 4,856,047 | 8/1989 | Saunders | 379/41 |
| 4,887,291 | 12/1989 | Stillwell | 379/57 |
| 4,993,059 | 2/1991 | Smith et al. | 379/39 |

FOREIGN PATENT DOCUMENTS 0251457 1/1988 European Pat. Off. .

Primary Examiner—Donnie L. Crosland
Attorney, Agent, or Firm—Staas & Halsey

[57] ABSTRACT

A mobile radio system has an upward and downward control channel for controlling a call-out transmitted from a mobile terminal station, independently from a communication channel. The system detects an abnormal state of an automobile equipped in the mobile terminal station, and automatically transmits a call-out signal through the upward control channel to said base station when the abnormal state is detected. The abnormal state occurs when a door is opened, for example. It receives a response signal via the downward control channel from a base station, the response signal corresponding to the call-out signal of the terminal station, and produces an alarm sound when identification signal ID of the terminal station is detected from the response signal. Thus, the abnormal state of the automobile can be indicated by the alarm sound outputted from the portable receiver, thereby preventing the automobile from theft.

3 Claims, 4 Drawing Sheets

RADIO AUTOMATIC ALARM TRANSFER SYSTEM

BACKGROUND OF THE INVENTION

The present invention relates to a radio apparatus equipped on an automobile for a mobile communication system, such as an automobile wireless telephone system or an MCA (multi channel access) wireless communication system, and more particularly to an alarm transfer system in a radio for preventing theft of the automobile itself or the radio apparatus.

There is no alarm transfer apparatus in a radio for preventing theft of an automobile itself or its wireless apparatus.

SUMMARY OF THE INVENTION

An object of the present invention is to prevent theft of an automobile itself or its radio apparatus, the theft being prevented by means of only an automobile radio telephone system or an MCA radio system to which a user subscribes for an original communication purpose, without necessitating that an owner A of an automobile subscribes to a radio calling system or other radio system.

A feature of the present invention is to provide a mobile radio system equipped with an exclusive control channel having an upward and downward control channel for controlling a call transmitted from or arriving at a moving terminal, independently from a communication channel, comprising abnormal state detecting means for detecting an abnormal state of an automobile equipped with a terminal in said moving terminal, automatic calling means for automatically transmitting a call production signal through upward control channel (CH12) to said base station when the abnormal state is detected, and portable receiving means for receiving a response signal via the downward control channel from the base station, said signal corresponding to the call production signal of the terminal, and for producing an alarm sound when identification signal ID of the terminal is detected from said response signal, whereby the abnormal state of the automobile can be indicated by the alarm sound outputted from said portable receiver.

PREFERRED EMBODIMENT OF THE PRESENT INVENTION

Figure 1:
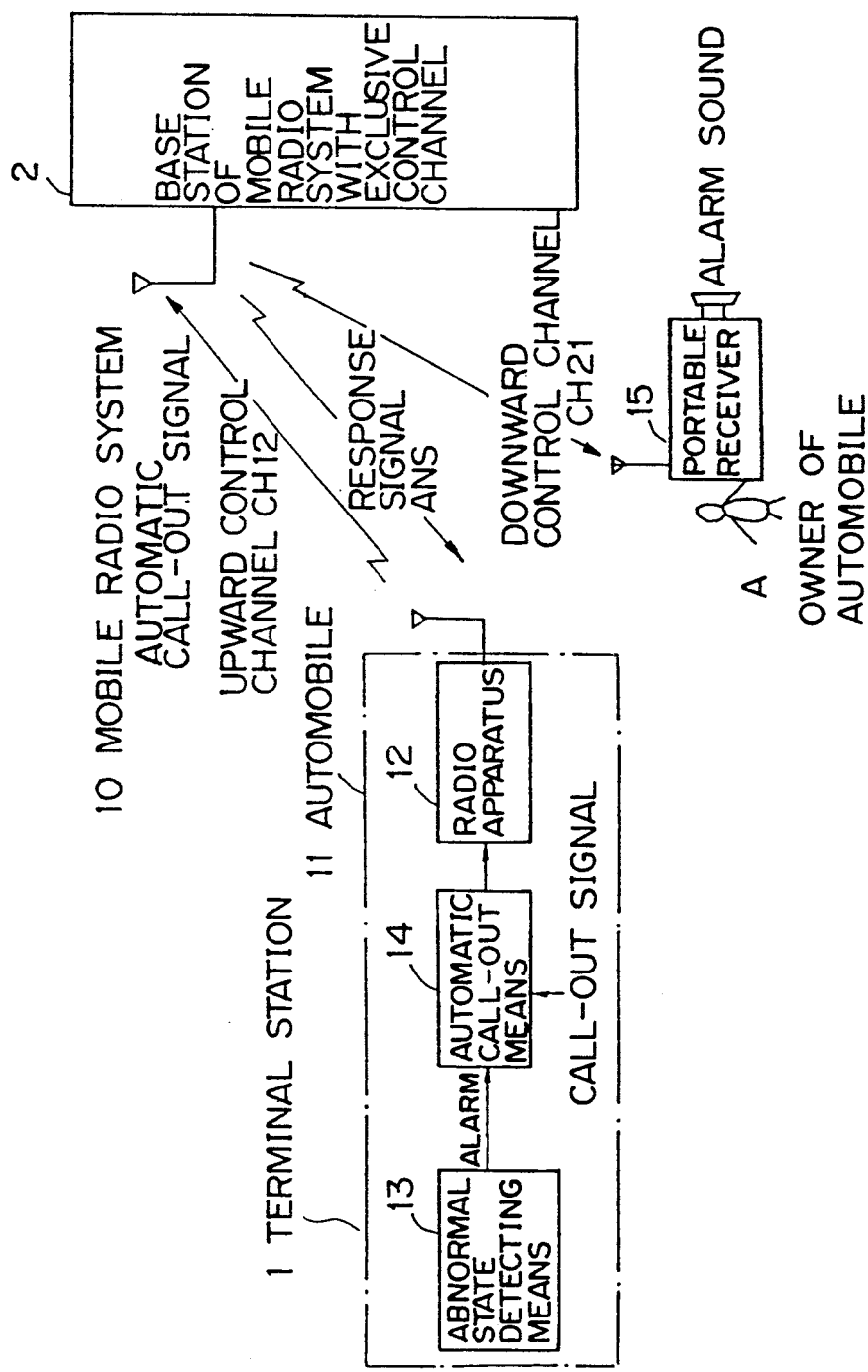
FIG. 1 shows the principle structure of the raido automatic alarm system of the present invention.

An embodiment of the present invention is described by referring to the drawings.

FIG. 1 describes the principle of a radio automobile alarm transfer system according to the present invention. An automobile radio telephone system or MCA radio system to which an owner A of an automobile subscribes for an original communication purpose has a so-called exclusive control channel system, namely, where terminal station 1 produces a call-out via upward control channel CH12 directed from terminal station 1 to base station 2, base station 2 always returns a response signal ANS corresponding to the call-out signal by using downward control channel CH21 and by attaching an identification code ID of call-out station or terminal station 1. A portable receiver 15 is provided. This receiver is carried by an owner A of automobile 11 when he leaves the automobile and can receive response signal ANS using downward control channel CH21. Automobile 11, equipped with terminal station 1, has abnormal state detecting means 13 for detecting an abnormal state in the automobile and automatic call-out means 14 for enabling terminal station to automatically transmit a call-out signal. A radio alarm signal is automatically transmitted to base station 2 of the mobile radio system using upward control channel CH12 and response signal ANS is transmitted from base station 2 using downward control channel CH21. Where portable receiver 15 detects identification signal ID directed to local terminal station 1 in response signal ANS from base station 2, an alarm sound is produced and the owner A of automobile 11 can recognize the abnormal state of automobile 11 based on the alarm sound.

As shown in FIG. 1, a terminal station 1 of mobile radio system 10 equipped with an exclusive control channel to which owner A of automobile 11 subscribes for an original communication purpose. Terminal station 1 transmits a call-out signal via an upward control channel CH12 which is directed from local terminal station 1 to base station 2 and receives response signal ANS to which identifitaion code ID of local terminal station 1 corresponding to the call-out signal by using a downward control channel CH21 directed from base station 2 to terminal station 1.

When base station 2 receives the call-out signal from call-out terminal station 1 via upward control channel CH12, base station 2 transmits response signal ANS corresponding to the call-out signal to terminal or call-out station 1 by attaching identification code ID of the terminal or call-out station 1. Automobile 11 is equipped with terminal station 1. Radio apparatus 12 in terminal station 1 transmits the call-out signal of terminal station 1 to base station 2 via upward control channel CH12 and receives response signal ANS corresponding to the call-out signal from base station 2 via downward control channel CH21.

Alarm state detecting means 13 detects an abnormal state of automobile 11 equipped with terminal station 1, and transmits an alarm. An automatic call-out means 14 generates a call-out signal of terminal station 1 in accordance with an alarm output from abnormal state detecting means 13, thus enabling radio apparatus 12 in terminal station 1 to transmit a radio call-out signal through upward control channel CH12.

Portable receiver 15 is carried by owner A of automobile 11 and receives or intercepts response signal ANS through downward control channel CH21. It produces an alarm sound when it detects identification signal ID of local terminal station 1 in response signal ANS transmitted from base station 2. Radio apparatus 12 in local terminal station 1 is formed such that automatic call-out means 14 is automatically activated to produce a call-out signal by an output alarm in abnormal state detecting means 13 for detecting an abnormal opening of a door of the automobile 11, for example, and such that the radio call-out signal is transmitted to base station 2 via upward control channel CH12. Therefore, owner A of automobile 11 carrying portable receiver apparatus 15 can detect an abnormal state of automobile 11 itself or, of radio apparatus 12 of local terminal station 1, from an alarm sound produced by receiver 15.

Terminal station 1 in mobile radio system 10 is equipped with an exclusive control channel to which owner A of automobile 11 subcribes for communication. It transmits a call-out signal through upward control channel CH12 from local terminal station 1 to base station 2 and receives response signal ANS equipped with identification code ID of local terminal station 1 corresponding to the call-out signal, the response signal ANS being always transtmitted from base station 2 to local terminal station 1 through downward control channel CH21. Portable receiver 15 receives response signal ANS via downward control channel CH21 from base station 2, portable receiver 15 being carried by owner A of automobile 11. When it detects identification signal ID of local terminal station 1 in response signal ANS transmitted from base station 2 to local terminal station 1, it produces an alarm sound.

Owner A of automobile 11 needs not subscribe to a system other than mobile radio system 10 used for comunication purpose. He merely provides abnormal state detecting means 13 for detecting an abnormal opening of a door of automobile 11 and automatic call-out means 14 for transmitting radio alarm signal to base station 2 by enabling radio apparatus 12 of local terminal station 1 to automatically produce the call-out signal in accordance with the output alarm from abnormal state detecting means 13. When the owner A leaves from his automobile 11, he carries a simple portable receiver 15 on which he can hear an alarm sound indicating an abnormal state of automobile 11 itself or radio apparatus 12 equipped in automobile 11. Thus, the problem of the high cost of the radio automatic alarm transfer system is solved, as any special radio alarm transfer system is not necessary.

Figure 2:
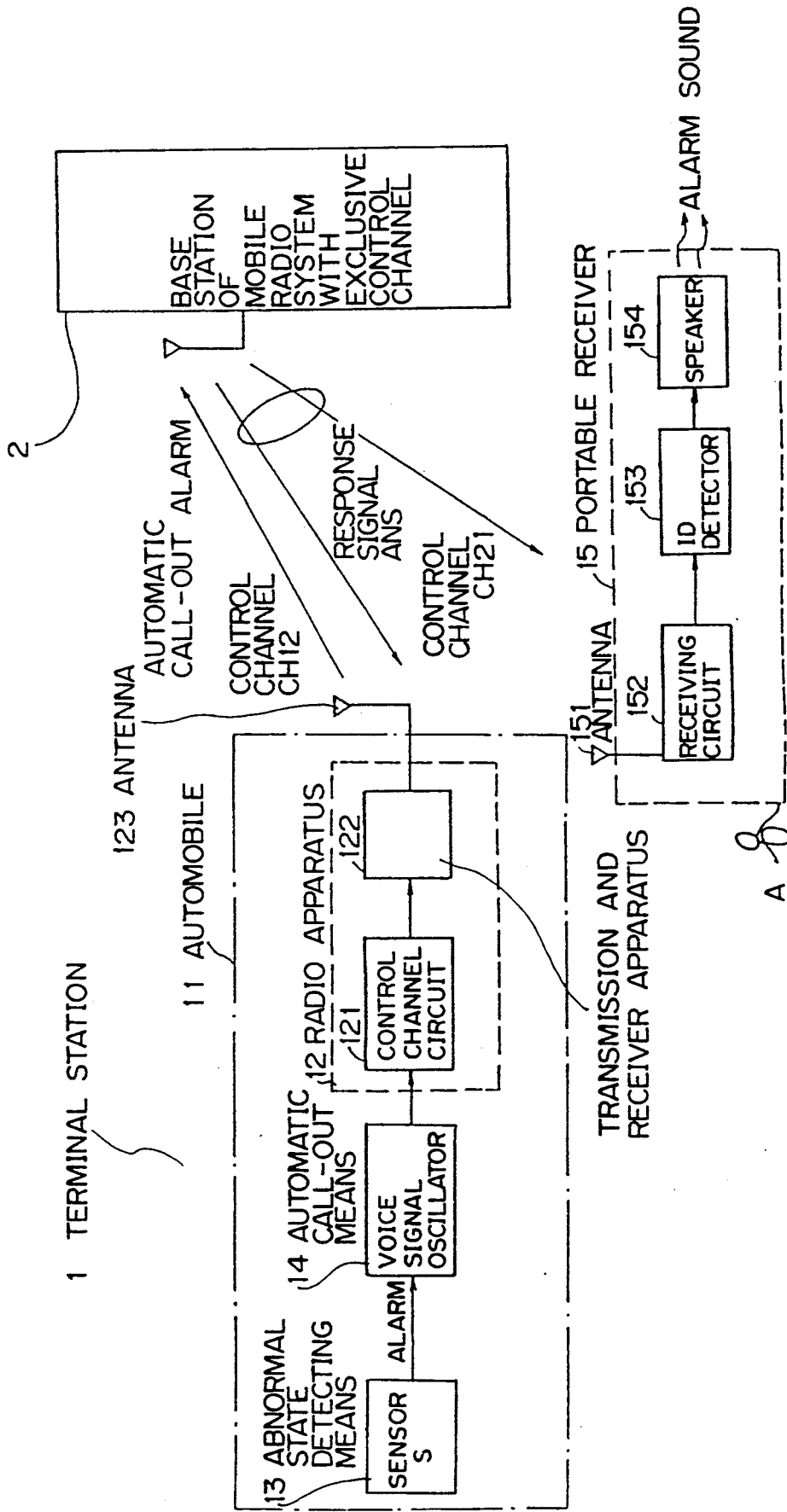
FIG. 2 is a block diagram for explaining the operation of a radio automatic alarm transfer system of an embodiment of the present invention.

FIG. 2 is a block diagram showing the structure of a radio automatic alarm system according to an embodiment of the present invention, which is applied to an automobile wireless telephone system as a mobile wireless system equipped with an exclusive control channel.

In FIG. 2, abnormal state detecting means 13 in terminal station 1 is formed by a sensor S for detecting an abnormal state. It detects an abnormal state such as an abnormal opening of a door of an automobile 11 equipped with radio apparatus 12 in terminal station 1 in an automobile radio telephone system and transmits an alarm to automatic call-out means 14.

Automatic call-out means 14 is formed by a voice or tone signal oscillator. It produces a voice or tone signal as a call-out signal of terminal station 1 in accordance with an output alarm of a sensor S of abnormal state detecting means 13, and inputs the voice or tone signal into the radio apparatus 12 of terminal station 1.

Radio apparatus 12 in terminal station 1 is formed by control channel circuit 121, transmission and receiver apparatus 122 and antenna 123. Control channel circuit 121 inputs a voice or tone signal as an output from a voice or tone signal oscillator of automatic call-out means 14 and a transmitting unit of the transceiver 122 of radio apparaus 12 automatically transmits the voice or tone signal to base station 2 via the automobile radio telephone system through upward control channel CH12 as a radio call-out signal.

Figure 3A:
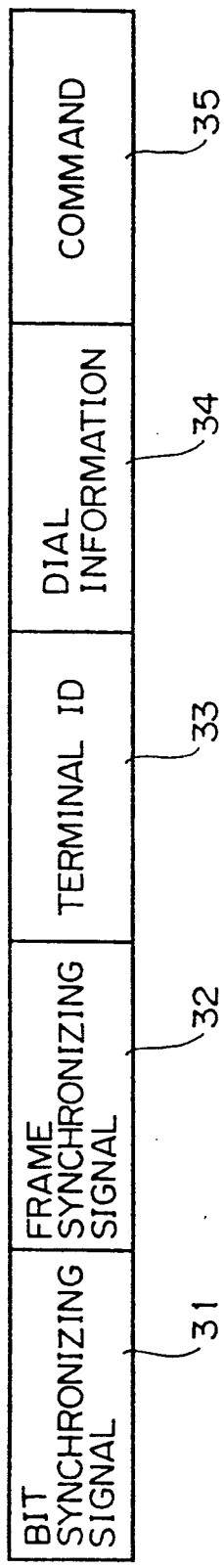
FIG. 3A shows the structure of a frame to be transmitted to a base station.

FIG. 3A shows the structure of a frame transmitted from the terminal station to the base station. Bit synchronizing signal 31 is for performing a synchronization of a bit within a frame and is formed of a pattern such as 101010. . . . Frame synchronization signal 32 is formed of a predetermined pattern for determining delimitation of respective signals and the position following signals is determined based on the position of this pattern. Terminal ID field 33 designates which terminal produces this frame. Dial information 34 shows the field of the dial number (in case of a call-out) of the opposite party with which the terminal station producing the frame desires to communicate. Command 35 comprises a command such.as a call-out to be transmitted to base station 2.

In FIG. 2, base station 2 in the automobile radio telephone system receives a radio call-out signal, namely, the aforementioned frame, through upward control channel CH12 from terminal station 1. Then, it always transmits response signal ANS through downward control channel CH21 to terminal station 1 of a call-out station by attaching identification signal ID of terminal station 1 to response signal ANS.

Portable receiver 15 is carried by the owner A of the automobile 11 when he leaves the automobile, and receives or intercepts response signal ANS via downward control channel CH21 from the base station 2. It comprises antenna 151, receiving circuit 152, ID detecting circuit 153 and speaker 154. When ID detecting circuit 153 detects identification signal ID of local terminal station 1 among response signals ANS transmitted from base station 2 to terminal station 1 and received by antenna 151 and receiving circuit 152, speaker 154 produces an alarm sound of the sound signal.

Owner A of automobile 11, who carries portable receiver 15, can detect an abnormal occurrence in automobile 11 itself or in radio apparatus 12 equipped in automobile 11.

Figure 4:
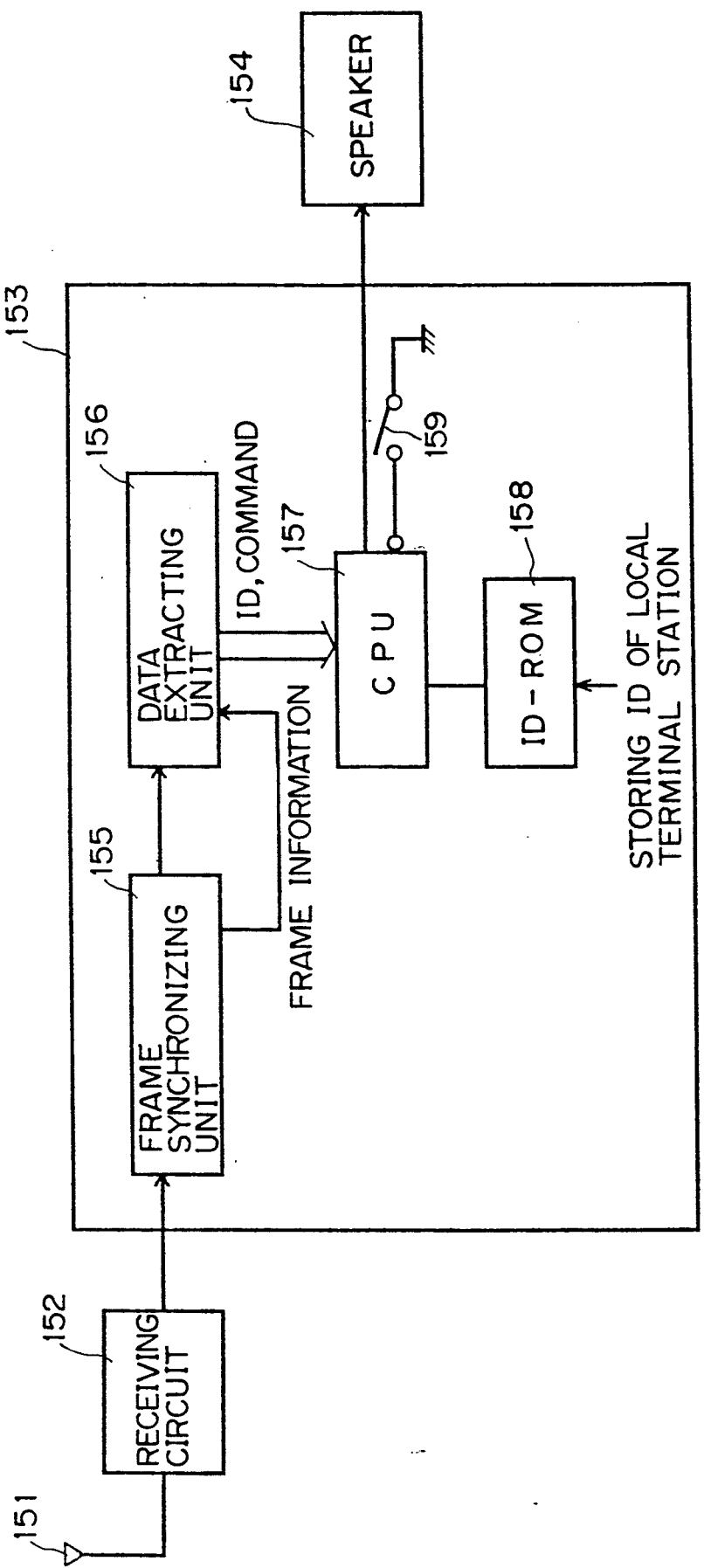
FIG. 4 is a detailed block diagram of the reciever used in the embodiment shown in FIG. 2.

FIG. 4 shows the detailed structure of the portable receiver apparatus. Receiving circuit 152 is connected to antenna 151. Antenna 151 receives a signal in a control channel transmitted from base station 2 of the automobile telephone system and receiving circuit 152 demodulates the signal in the control channel. Receiving circuit 152 obtains the frame of the signal in the control channel transmitted from base station 2 of the automobile telephone system, from the demodulated signal and applies it to ID detector 153.

ID detector 153 comprises frame synchronizing unit 155 for detecting a frame synchronizing signal of a frame, data extracting unit 156 for receiving frame information detected by frame synchronizing unit 155 and for extracting the data in an object area (an area for ID or a command) within the frame, and CPU 157 for comparing ID extracted by data extracting unit 156 with the local station ID stored in ID-ROM 158. Frame synchronizing unit 155 obtains a synchronizing signal for the frame demodulated by receiving circuit 152.

Figure 3B:
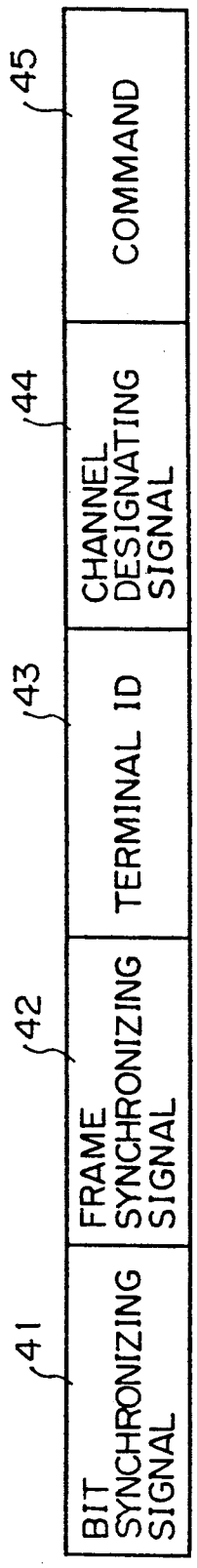
FIG. 3B shows the strucure of a frame transmitted from the base station.

FIG. 3B shows a structural view of a frame transmitted from the base station to terminal station 1. The frame comprises bit synchronizing signal 41, frame synchronizing signal 42, terminal ID 43, channel designation signal 44 and command 45. Bit synchronizing signal 41 is for obtaining a synchronization of a bit within a frame and comprises a pattern such as 1010 . . . which is easy to obtain the bit synchronization. Unit 155 obtains a synchronization of an internal clock generator based on this synchronizing signal. Frame synchronization signal 42 is a predetermined pattern for determining a delimitation of respective signals and the location of the following signals is determined based on the pattern position. Terminal ID field 43 determines the terminal to which this frame should be transmitted. Channel designation signal 44 designates a channel through which a communication is to be conducted. Command 45 is for a response to an call-in or a call-out or a request for an alarm sound production or a busy signal.

By obtaining the above-described bit synchronization, a position for a frame synchronization signal can be provided. Furthermore, frame synchronization unit 155 sequentially reads a bit of a frame in one-bit units in accordance with a clock synchronized with the bit synchronization signal to detect a frame synchronization signal. When a signal for detecting the frame synchronization and a bit reading clock are applied to data extraction unit 156, data extracting unit 156 reads terminal ID to be outputted to CPU 157. CPU 157 compares the ID of the local terminal station stored in the ID-ROM with the ID read from the frame. When the local terminal station ID accords with the ID read from the frame, speaker 154 is driven to produce an alarm sound.

The portable receiver in the embodiment of the present invention produces an alarm sound from speaker 154 when the terminal ID of the local terminal station exists in the received frame. However, the present invention is not limited to this embodiment. For example, the telephone number which is dialed when an alarm sound is produced in an automobile wireless telephone system may be previously determined. When the call out request is transmitted from the terminal station to the telephone number, base station 2 of the automobile wireless telephone system returns the terminal ID and the alarm sound generation command to terminal station 1 as the response corresponding to the call-out request. Portable receiver 15 produces an alarm sound when the received ID number accords with the ID number of the local terminal station and the alarm sound generation command is received. Therefore, a generation of an alarm sound due to the arrival of the call-in signal can be prevented as the alarm sound generation command is not received, although the terminal ID numbers are the same.

One terminal of switch 159 is gounded and the other is connected to CPU 157. Therefore, when switch 159 is turned on, an L level is applied to CPU 157. When this L level is applied, the alarm sound is produced only when the ID numbers are in accord with each other. When switch 159 is off, the H level signal is applied to CPU 157. When the H level signal is applied to CPU 157, the alarm sound is produced when the ID numbers are in accord with each other and when the alarm sound generation command is received. Therefore, owner A can select the kind of the operation which he requires. For example, switch 159 may turn off if an alarm sound is produced only upon the abnormal state of the automobile and it may turn on when the alarm sound is produced upon an abnormal state of the automobile or upon receipt of the call-in signal. Therefore, the alarm sound may be produced even when the call-in signal is received by terminal station 1 when the owner A leaves the automobile.

Where a plurality of exclusive control channels may be provided in the system and then upward control channel CH12, through which terminal station 1 of the automobile automatically produces a call-out, does not accord with downward control channel CH21 through which the corresponding base station 2 returns response signal ANS, and therefore, does not accord with downward control channel CH21 through which portable receiver 15 is waiting for a response signal, base station 2 transmits the response signal to all the downward control channels when base station 2 receives the call-out signal designating an alarm transfer from terminal station 1 of the automobile.

In accordance with the above operation, in a radio automobile alarm transfer system of an embodiment shown in FIG. 2, owner A of the automobile 11 need not subscribe to a radio call system other than the automobile radio telephone system originally installed and used for an original communication purpose. The radio automobile alarm transfer system of the present invention merely needs sensor S in abnormal state detecting means 13 for sensing an abnormal opening of a door of the automobile 11 and a voice or tone signal oscillator in automatic call-out means 14 for automatically enabling radio apparatus 12 of terminal station 1 to produce a call-out by the alarm output and transmit the radio alarm signal to base station 2 as a call-out signal. When the owner A leaves his automobile 11, he carries a simple portable receiver on which he can hear the sound of the portable receiver 15 and, thereby detect an abnormal state of automobile 11 itself or radio apparatus 12 equipped with automobile 11. Therefore, the cost of the radio automatic alarm transfer system which the owner A of the automobile 11 should pay does not become high.

It is a matter of course that the present invention is not limited to an automobile but may be applied to any kinds of vehicles such as a motorcycle and a motorboat.

As described above, the owner of the automobile needs not subscribe to any other system than the mobile radio communication system to which the owner subscribes for his original communication purpose. When he leaves his car he may carry a simple portable receiver which enables him to detect an abnormal occurrence to his automobile and to provide a necessary countermeasure.

It is also possible to produce an alarm signal when the call-in signal arrives and to detect the arrival of the call-in signal at the terminal station when the owner leaves the automobile.

What is claimed is:

1. A mobile ratio system equipped with an exclusive control channel having an upward and downward control channel for controlling a call-in and call-out in a mobile terminal station by a base station, independently from a communication channel, comprising:

receiving means for receiving a response signal through the downward control channel from said base station of said moving radio system, detecting means for detecting an identification signal of a local mobile terminal station based on the response signal, and sound production means for producing an alarm sound when said detecting means detects the identification signal, and said receiving means further comprising selecting means for selecting a condition in which the alarm sound is produced and when an other condition is selected, said detecting means detects the identification signal, and when the other condition is selected, said detecting means detects said identification signal and a predetermined command.

2. The mobile radio system according to claim 1, wherein
said predetermined command is an alarm production command.

3. A mobile radio alarm transmission system equipped with a portable receiver in a mobile radio system including an exclusive channel having a receiving and sending control channel through which a base station controls a call sent from or received by a mobile terminal, said system comprising:
abnormal condition detecting means for detecting an abnormal condition of a mobile unit equipped with said mobile terminal; and
automatic calling means for generating a frame when an abnormal condition arises, said frame comprising a terminal ID, dial information about a specific number, and a command to indicate an abnormal condition, and for sending said frame over said control channel as a calling signal; and
said mobile terminal raising an alarm when said base station sends the terminal ID of said mobile terminal and the command to indicate an abnormal condition contained in the frame generated by said automatic calling means through said control channel from said base station in response to a calling signal.

* * * * *

UNITED STATES PATENT AND TRADEMARK OFFICE
CERTIFICATE OF CORRECTION

PATENT NO. : 5,140,308
DATED : August 18, 1992
INVENTOR(S) : Kenya Tanaka

It is certified that error appears in the above-identified patent and that said Letters Patent is hereby corrected as shown below:

Column 1, line 56, "reciever" should be --receiver--;

Column 2, line 32, "identifitaion" should be --identification--;

Column 3, line 15, "transtmitted" should be --transmitted--;

Column 3, line 65, "apparaus" should be --apparatus--;

Column 5, line 45, "gounded" should be --grounded--;

Column 6, line 48, "ratio" should be --radio--.

Signed and Sealed this

Fifth Day of October, 1993

Attest:

BRUCE LEHMAN

Attesting Officer    Commissioner of Patents and Trademarks